Figure 1:
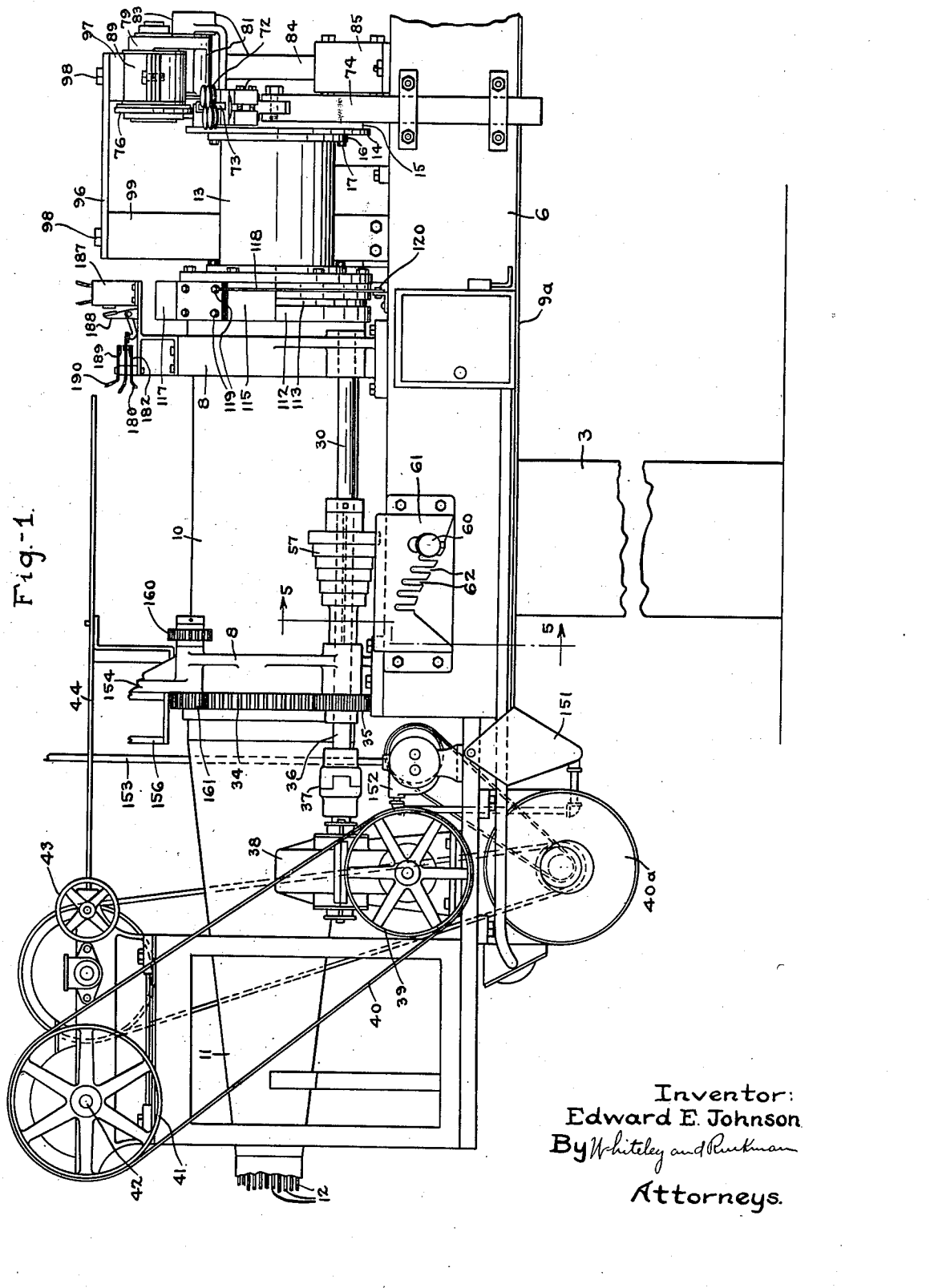

July 7, 1936.  E. E. JOHNSON  2,046,461
PROCESS OF FABRICATING SCREENS
Filed Nov. 10, 1934  9 Sheets-Sheet 1

Inventor:
Edward E. Johnson
By Whiteley and Ruckman
Attorneys.

July 7, 1936.   E. E. JOHNSON   2,046,461
PROCESS OF FABRICATING SCREENS
Filed Nov. 10, 1934   9 Sheets-Sheet 4

Inventor:
Edward E. Johnson.
By Whiteley and Ruckman
Attorneys.

July 7, 1936.  E. E. JOHNSON  2,046,461
PROCESS OF FABRICATING SCREENS
Filed Nov. 10, 1934  9 Sheets-Sheet 5
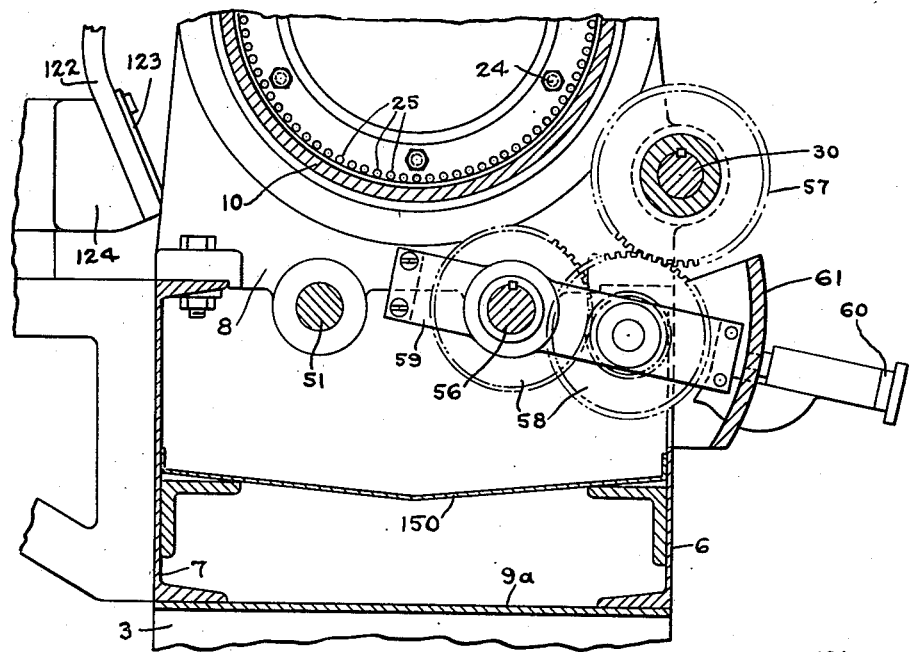
Fig.-5.
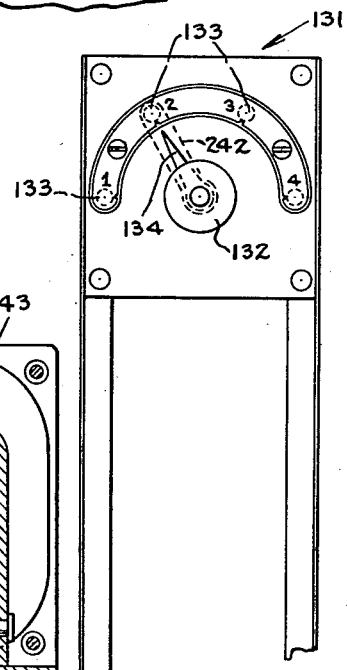
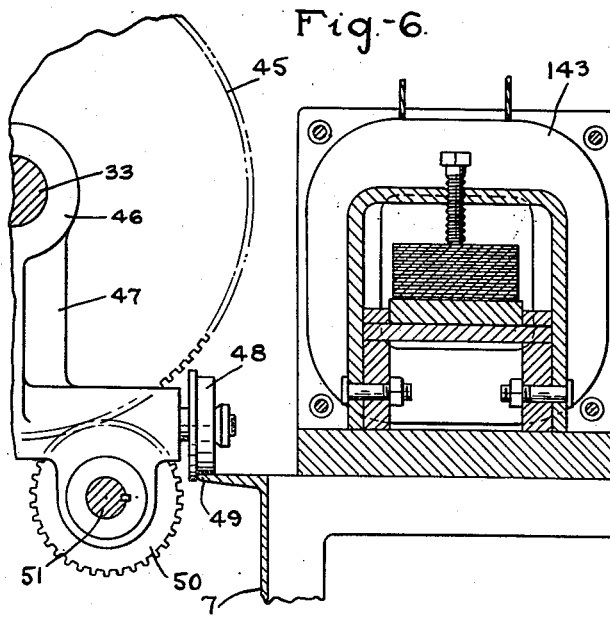
Fig.-6.
Inventor:
Edward E. Johnson.
By Whiteley and Ruckman
Attorneys.

July 7, 1936. E. E. JOHNSON 2,046,461
PROCESS OF FABRICATING SCREENS
Filed Nov. 10, 1934 9 Sheets-Sheet 6
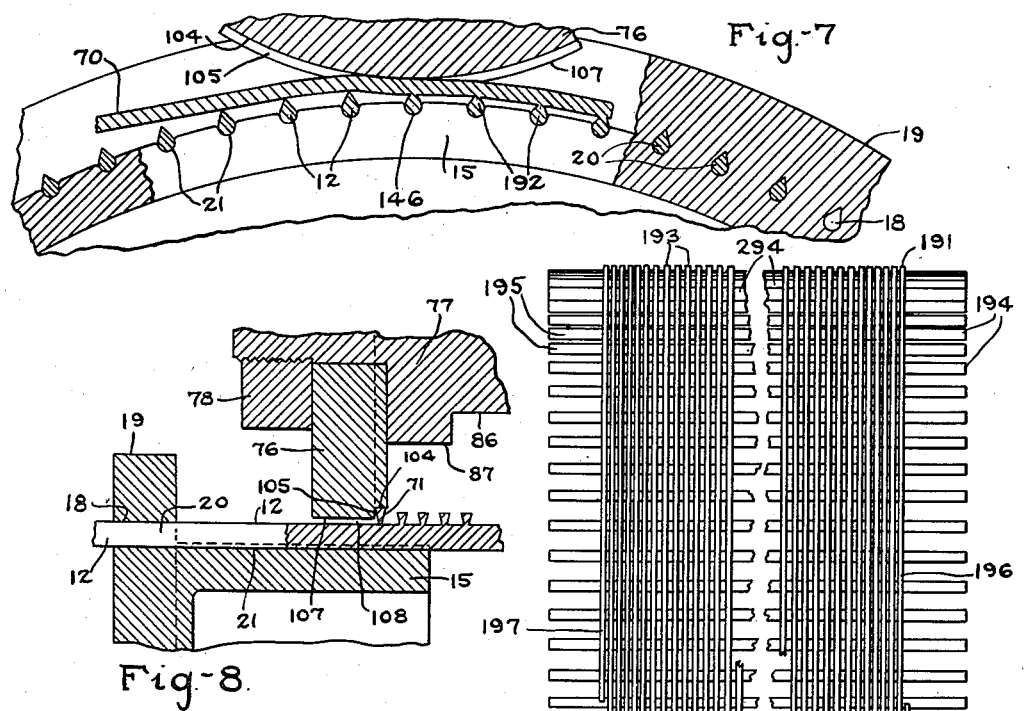
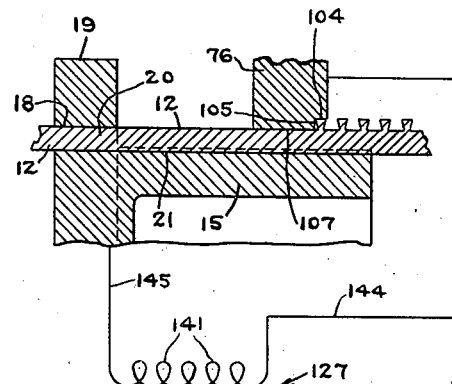
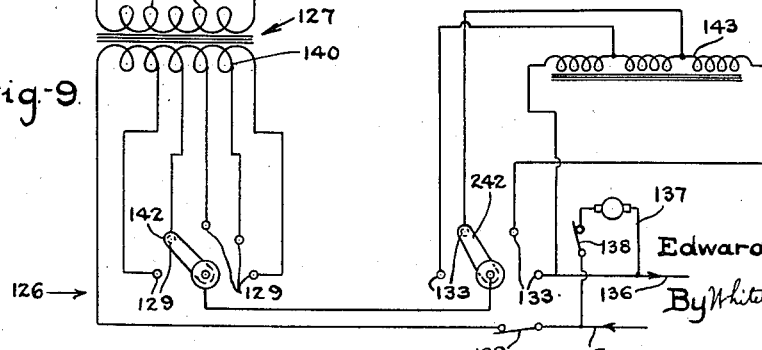
Inventor:
Edward E. Johnson.
By Whitley and Ruckman
Attorneys.

July 7, 1936.    E. E. JOHNSON    2,046,461
PROCESS OF FABRICATING SCREENS
Filed Nov. 10, 1934    9 Sheets-Sheet 7
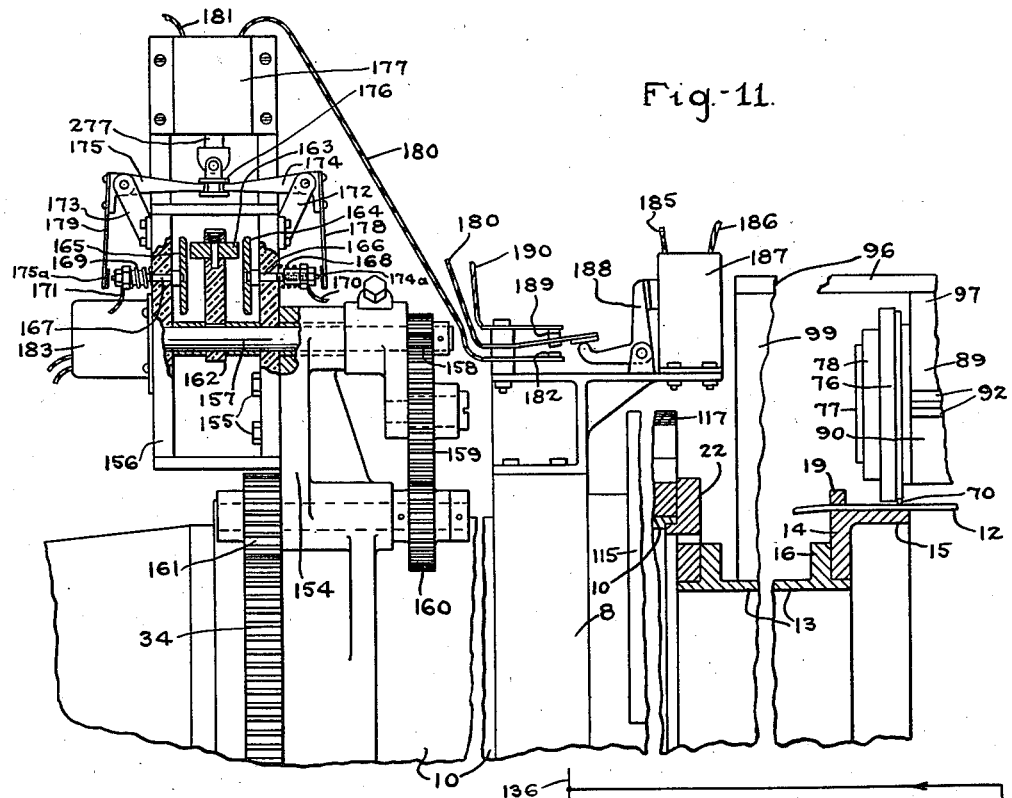

July 7, 1936.  E. E. JOHNSON  2,046,461
PROCESS OF FABRICATING SCREENS
Filed Nov. 10, 1934  9 Sheets-Sheet 8
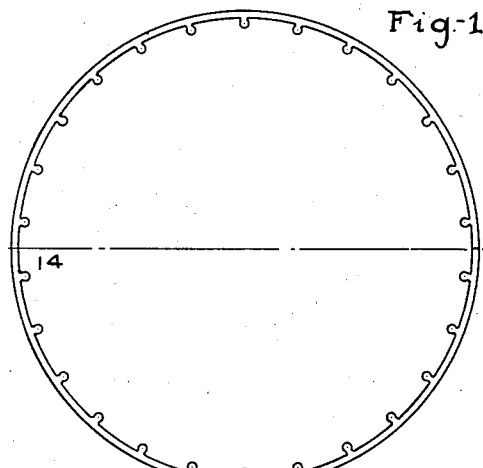
Fig.-13.
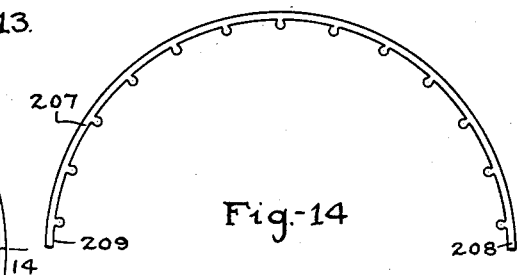
Fig.-14
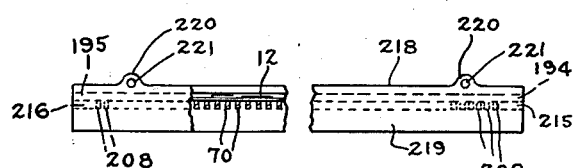
Fig.-17.
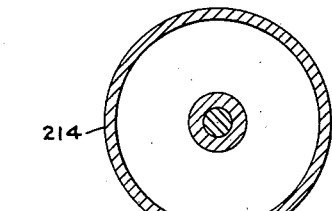
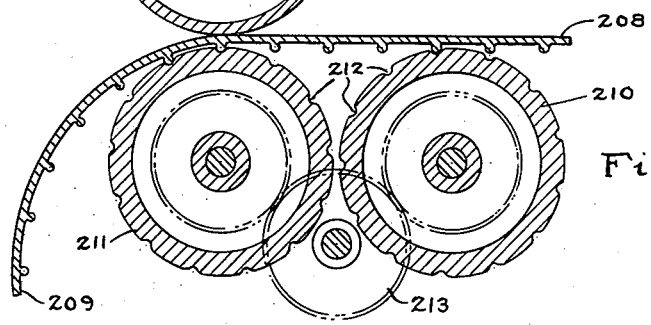
Fig.-15
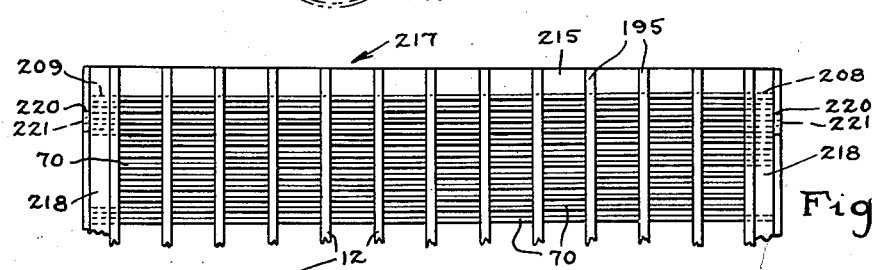
Fig.-16.
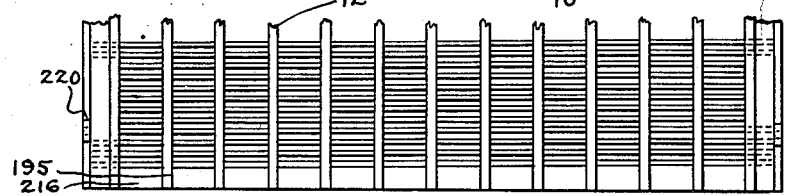
Inventor:
Edward E. Johnson
By Whiteley
and
Ruckman
Attorneys

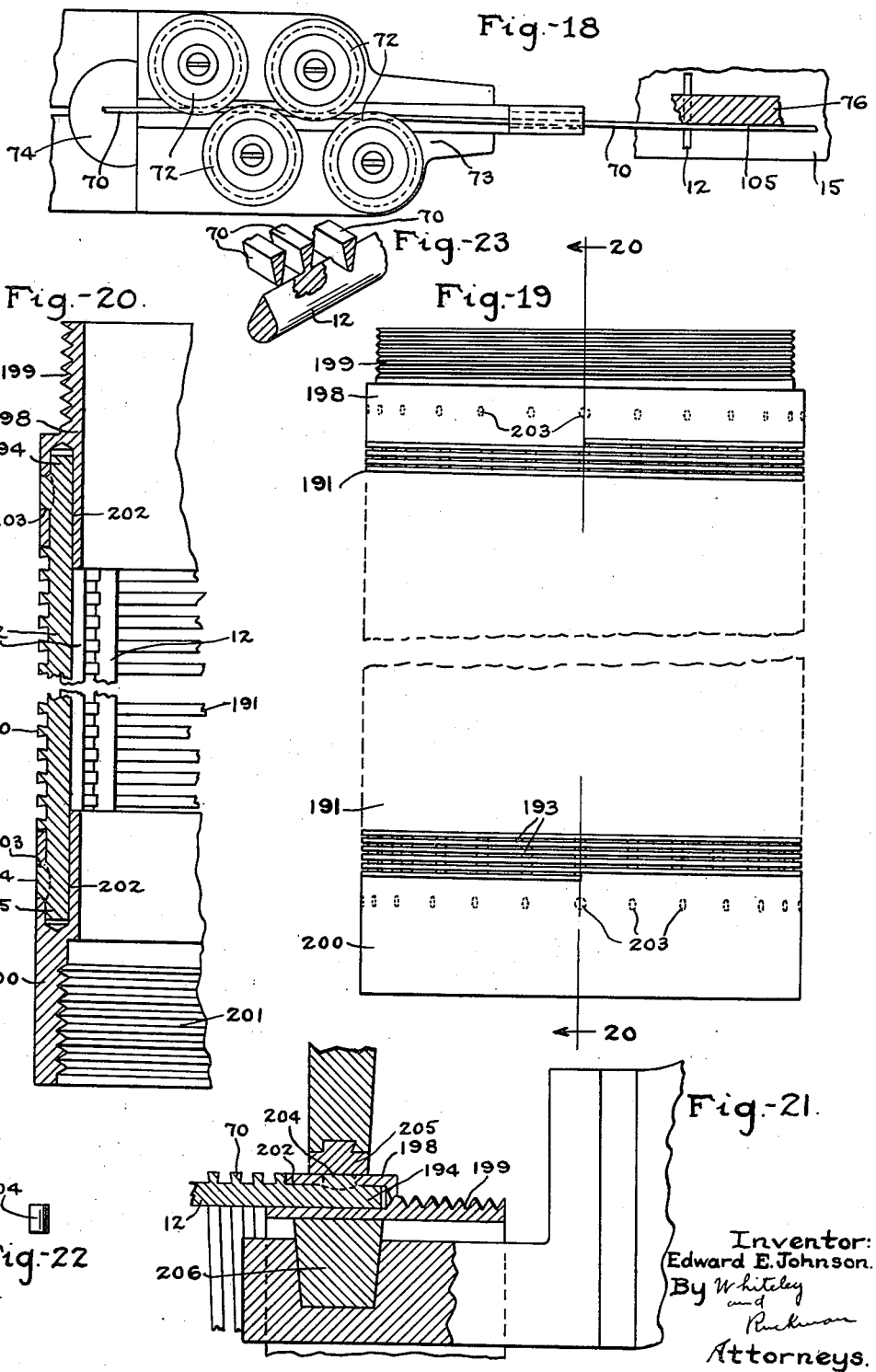

Patented July 7, 1936

2,046,461

UNITED STATES PATENT OFFICE 2,046,461

PROCESS OF FABRICATING SCREENS

Edward E. Johnson, St. Paul, Minn., assignor to Edward E. Johnson, Incorporated, St. Paul, Minn.

Application November 10, 1934, Serial No. 752,384

17 Claims. (Cl. 140—71)

My invention relates to a process of fabricating screens, and has for its object to produce a cylindrical or flat screen having a cellular structure embodying a multiplicity of longitudinal and transverse elements, in the cylindrical form comprising circumferential elements upon the longitudinal elements in coils, the edges of said coils being everywhere equally spaced from those of adjacent coils to form continuous drainage slots, and said respective elements being sunk one within the other uniform predetermined distances in such manner as to produce a screen, particularly adapted for well screen purposes, of exceptional strength and rigidity for weight of material employed, and having substantially uninterrupted screening slots to provide maximum flowage capacity.

It is an object of my invention of a process of making screens to hold a group of wires or rods so that all of them will extend horizontally and with their outer limits will outline a circle in one vertical plane, to hold an irregularly-shaped wire in said plane and so that a selected part thereof will contact at least one of said horizontal wires or rods and be secured thereto, simultaneously to rotate and advance longitudinally the said group of rods, whereby the wire so held will have the aforesaid selected portion caused to engage successively each rod, to lay coils about all the rods in the form of a helix with the edges of the wires of adjacent coils everywhere equally spaced, to engage said wire as it is held and caused to wind over the group of rods with an electrode, and to pass electric current therethrough and through the wire and each of said rods at all their crossing points for the purpose of welding and metallically integrating the wire and rods at each said crossing point, to merge the wire and rods together at each crossing point thereof a distance which will bring the outer extremities of the various helical coils into common longitudinal planes parallel with the axis of the resulting cylindrical structure, to cause current to be diverted away from the welding point after welding fusion and said merger of wire and rods have been accomplished, to flood with water the contacting surfaces of electrode and wire and the adjacent surfaces of the two electrodes to effect rapid cooling and dissipation of heat from the successive welding operations, and when a sufficient length of said wire has been wound upon and integrated with the body of rods to produce a cylindrical screen of the desired length to use the exposed ends of said rods as a means of metallically integrating end fittings upon and as a part of the finished screen, and effecting such metallic integration of the rods and end members.

To accomplish this desirable result in a manner advantageous to the public by effecting the manufacture of said structures economically so they can be sold at a reasonable cost, is a highly important desideratum. An essential feature of my new process resides in the discovery which I have made of a means of rapidly welding the coils of wire to the supporting rods, which is opposed to all standard welding practice known to me or, as I believe, heretofore employed. This practice at the present time comprises what is known as seam welding, flash welding, arc welding, and spot welding. In the case of seam welding an electrode is moved continuously along a metallic surface above adjoining portions thereof—either two edges brought into alinement, sheets overlapping, or alined edges with an overlapping strip—the movable electrode and also the cooperating electrode, which may be either movable or stationary, being supplied with unbroken welding current, whereby a continuous weld is effected. In flash welding the electrodes have the shape of the parts to be welded which frequently are along irregular lines and current is flowed simultaneously to all parts of the weld, the electrodes being stationary. Arc welding is effected by hand manipulation of a pencil of heat from an electric arc. Spot welding, as the name implies, means the welding at a single point or spot between two parts or members to be welded. Continuous spot welding is effected by some form of make-and-break device whereby current is intermittently passed through the effective parts of the electrodes to bring about a succession of separated spot welds. I believe it to be true that intermittent welding heretofore has not been accomplished by the use of a continuous uninterrupted flow of current through the electrodes, and that the view has been uniformly entertained by experts in electric welding that intermittent welding with an uninterrupted current is impossible.

In the fabrication of welded screens as carried out by me in my earlier practice, described in my copending applications, Serial Numbers 467,527 and 599,970, of which this application is in part a continuation, I arranged the supporting rods for the well screen to outline a cylinder, wound the wire in a helix thereon and successively welded the wire to the rods at each crossing point as the wire was wound and laid on the rods. This was intermittent welding—a form of spot welding—and I assumed and believed that it could be effectively accomplished only by means of the use of a make-and-break device for giving the usual intermittent flow of current for spot welding. Accordingly such a make-and-break device was installed and employed by me, which was deemed essential to prevent destructive overheating and melting of the wire between crossing points.

The use of such a make-and-break device strictly limited the speed at which the wire could be wound and welded to successive crossing points. In connection with a long series of experimental efforts to increase the speed of this make-and-break as a welding means, on one occasion I undertook to effect the intermittent successive welding operation with electrical current continuously supplied to the electrode, and unexpectedly I discovered that when the distance between rods bore a certain relation to the speed of rotation of the head carrying the rods around and thus causing the wire to be coiled on the rods, such speed being astonishingly rapid and the rods spaced somewhat closer together—the intermittent welds were made with unbroken current, at low voltage and large current flow, even more effectively than with the use of a make-and-break device. It is, therefore, a primary object of my invention to effect the intermittent welding action of wire to rods at crossing points at an extremely rapid rate by using continuous instead of intermittent current and moving the wire across the rods under the welding electrode at a high rate of speed, said rods being spaced distances apart which are less than for make-and-break welding and are related to the rate of movement of the wire across the rods. By this means I am now enabled to effect from 1600 to 1800 welds per minute of a character superior to those made by the make-and-break method heretofore employed, where with said make-and-break method from 300 to 500 welds per minute is the highest attainable speed, and where with the higher speeds, there is danger of ineffective welding which results in imperfections in the finishd screen, often necessitating cutting out sections of said screen, which is, of course, an expensive proceeding.

I discovered further that this process of welding at high speed with unbroken current proved to be more effective when the initial contact of wire and rods is of small area. For this reason I have made the rods of a cross-sectional area somewhat pear-shaped with side walls that converge to a sharply acute angle, and I have held these rods in the rotating head so that the edges of this reduced portion extend radially outward to engage a somewhat similarly reduced portion of the wire wound upon the rods. This reduced portion of the wire results from making it rhomboidal in cross-section with inwardly-converging side walls. It is, therefore, a further object of my invention to reduce the first metallic contact between the rods and wire elements and thereby increase the efficiency of the intermittent welding operation at high speed with continuous current.

There is formed on the outer surface of this cylindrical screen a continuous helical slot everywhere of uniform width extending inwardly between the wider portions of adjacent coils of the helically-wound wire. Since in the use of intermittent welding at high speed with continuous flow of current the longitudinal rods must be spaced closer together, and it is desirable that they shall not block the inward flow of water or other liquid to the interior of the screen, it is a further object of my invention to form the longitudinal rods with converging side walls coming to a sharply acute angle and to hold said rods with the apex of said angle extended outwardly to contact the reduced portion of the wire helically wound upon the rods and to effect a welding action between the wire and rods so held whereby said reduced portions only are caused to be sunk together predetermined uniform distances and to be fused and welded together at those points and thereby the supporting rods will have no effective blocking action to inward flow of water or other liquid.

Since it is impracticable to have the head and the cage of rods carried thereby rotating at sufficiently high speed to employ continuous flow of current when the operation begins or instantly to stop such rotation for the termination of the welding operation, it is a further object of my invention to provide a make-and-break device operative to effect the first welding steps while the speed of rotation is accelerating and the last welding steps while it is retarding, together with means for rendering the make-and-break device inoperative when the speed of rotation approaches that at which the make-and-break device would no longer be effective and the continuous current operation will be effective. The acceleration of rotation is of course in geometrical progression from lower to higher speed, and its retardation is likewise in inverse geometrical progression from higher to lower speeds. Hence, when the make-and-break device is thrown out of operation as the speed approaches that which will effect something like 500 welds per minute almost immediately the maximum high speed is attained, and no injurious effect from unbroken current results. Conversely, the speed of rotation will diminish to a rate of something like 500 welds per minute, when the make-and-break device will be thrown back into operation, so rapidly that again no injury will result. Means for effecting this step in my complete process is one of the objects of this invention.

It is a further object of my invention, as a step in the process of making screens, to fabricate a cylindrical screen in the manner above defined and thereafter to cut the screen longitudinally midway between two longitudinal rods, either along one element at the end of a diameter or along diametrically opposite elements, thereafter to subject said fabricated cylindrical screen or portions thereof, to the action of bending rollers, whereby the curved coils of wire thereon will be straightened and the screen be made flat, applying thereafter to the exposed ends of said rods and wire coils finishing members welded to said ends whereby the resulting flat screen may be connected in any desired relation for use as a screening member.

It is a further object of my invention to fabricate the cylindrical screen aforesaid in such manner as to leave extended from the ends thereof considerable lengths of the rods forming the supports for the helically-wound wire, and to apply to said rods fittings to permit the screen to be connected in a pipe system. These fittings are formed with longitudinal bores adapted to receive the several rods and transverse bores extending into the longitudinal bores in which metal is welded to the rods and the walls of the fittings making the fittings integral with the rods.

The full objects and advantages of my invention will appear in connection with the detailed description thereof and its novel features are particularly pointed out in the claims.

In the drawings, which illustrate an apparatus for carrying out my invention,—

Figure 2:
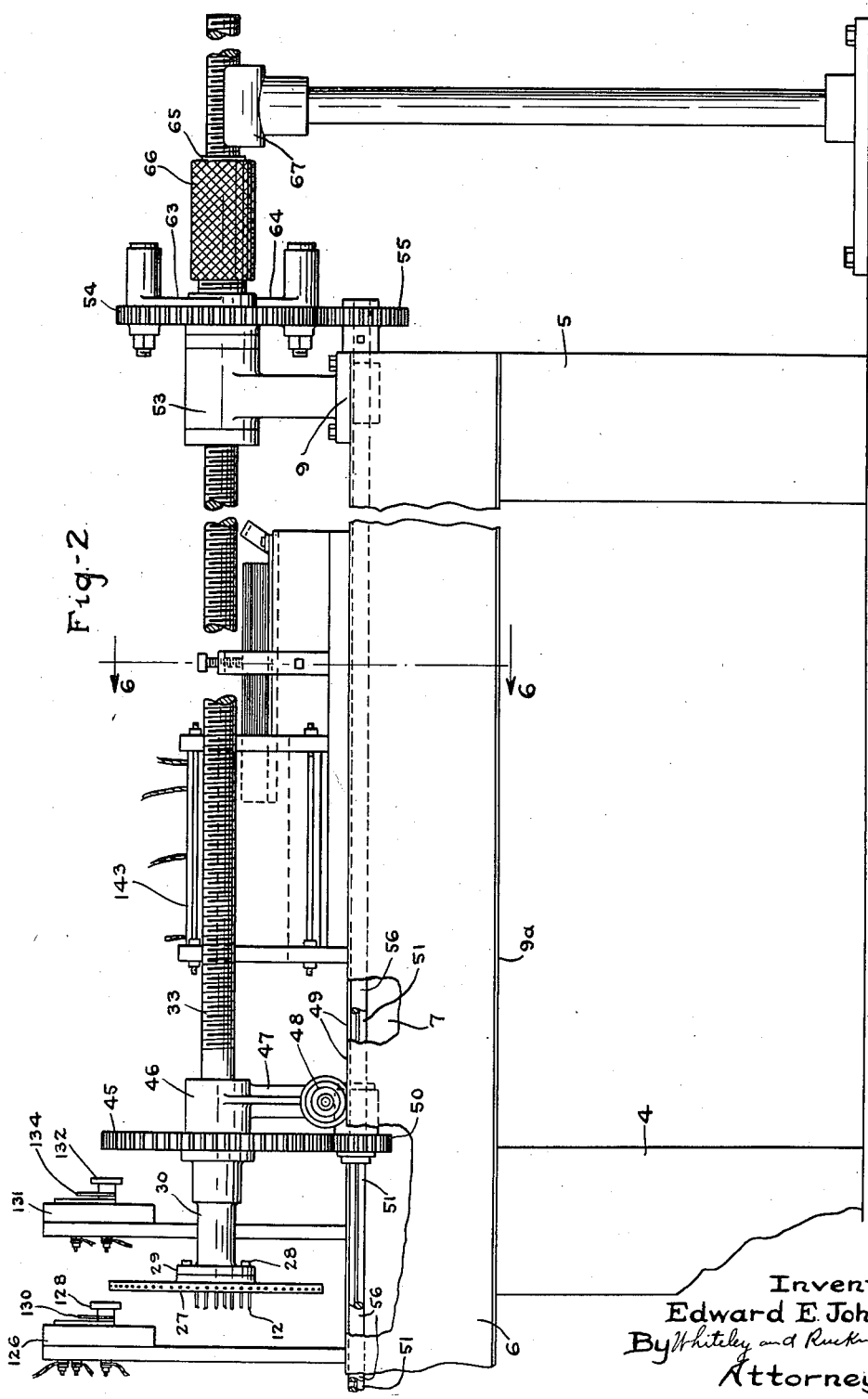
Figure 3:
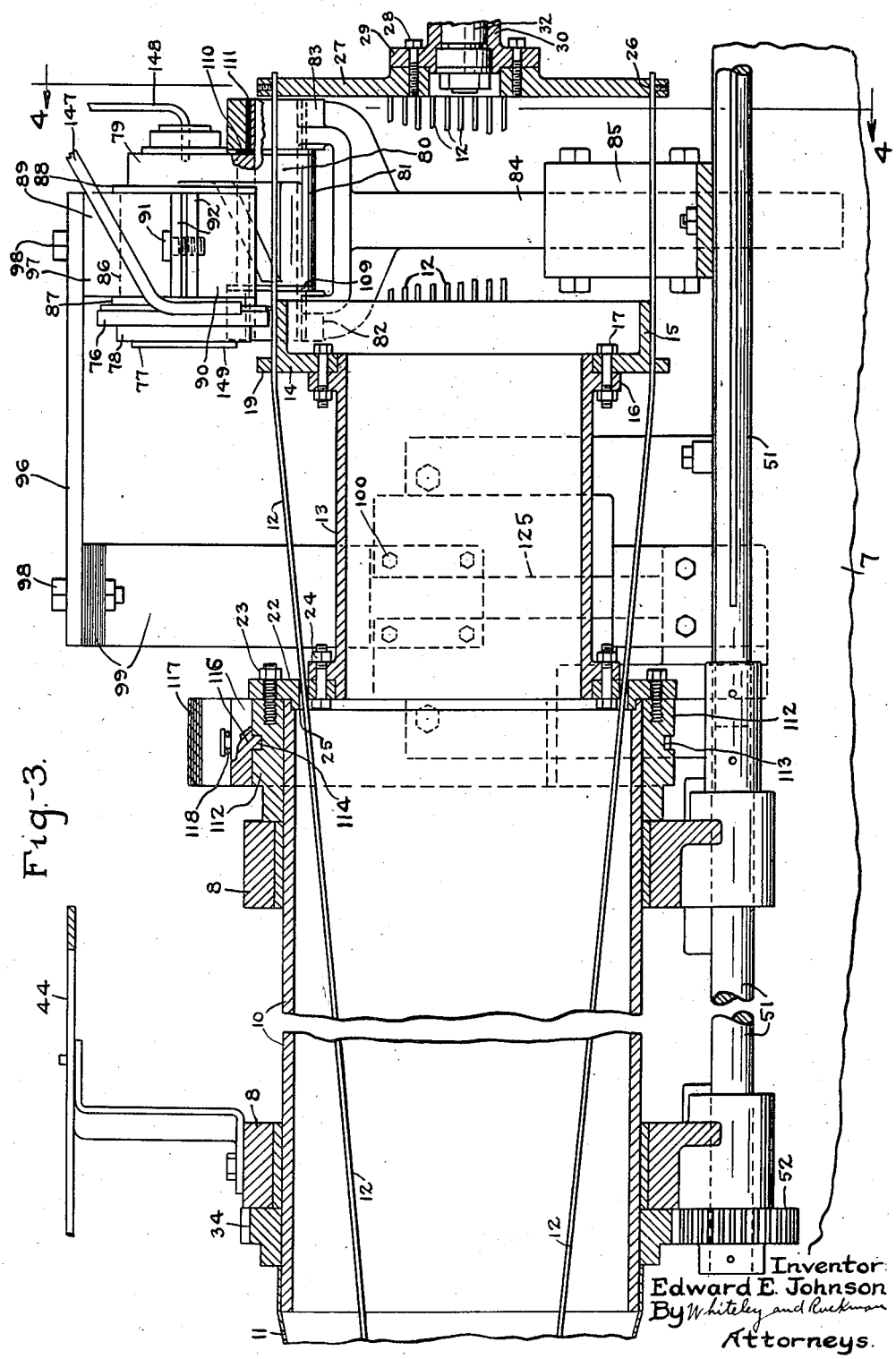
Figure 4:
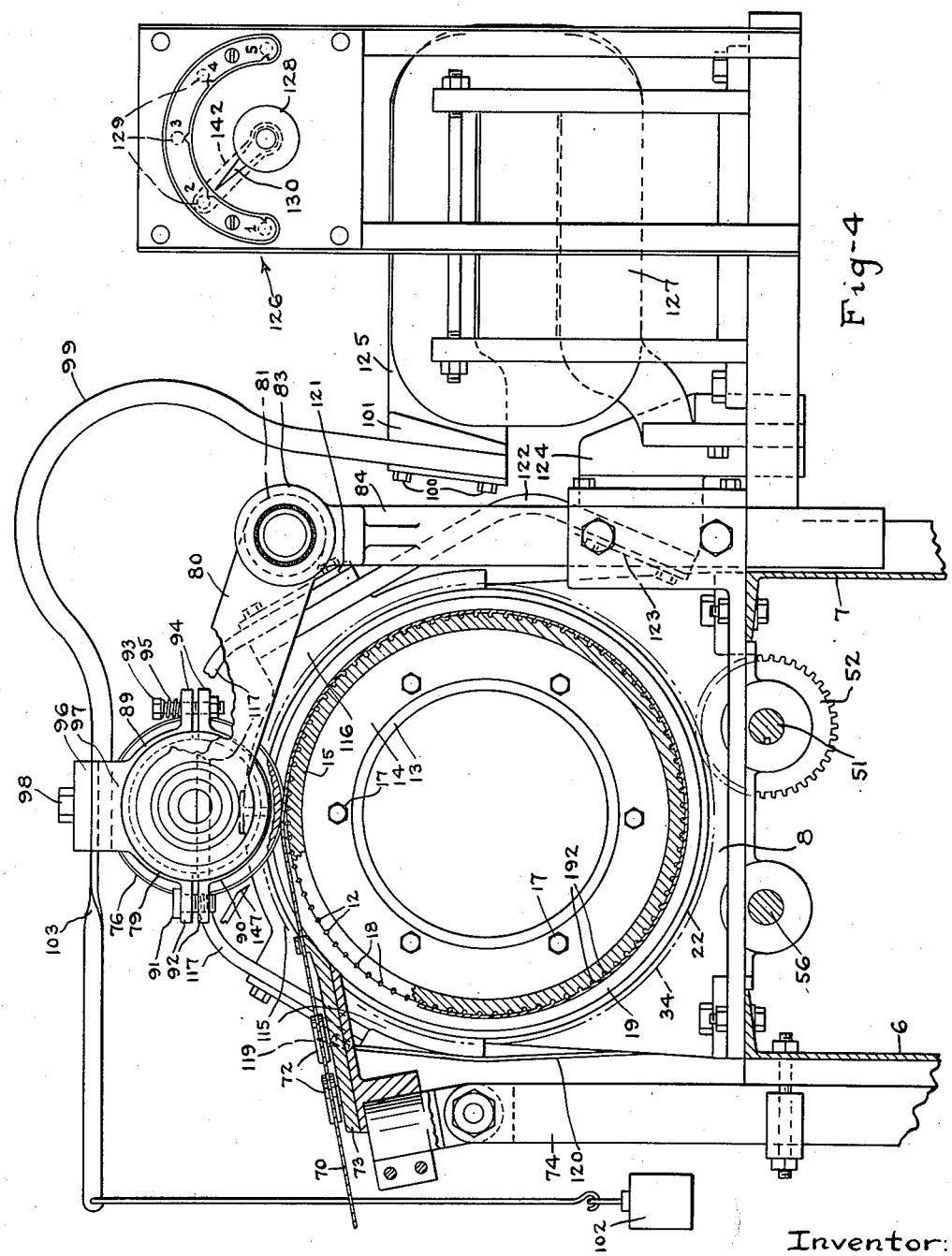

Fig. 1 is a side elevation view of a part of a machine for effecting some of the steps of my process. Fig. 2 is a side elevation with some parts broken away from the rest of said machine. Fig. 3 is a sectional elevation view of the forward portion of the mechanism shown in Fig. 1. Fig. 4 is a transverse sectional elevation view taken on line 4—4 of Fig. 3. Fig. 5 is a sectional elevation view taken in the position of line 5—5 of Fig. 1. Fig. 6 is an enlarged sectional elevation view taken in a position at the side of the machine on line 6—6 of Fig. 2. Fig. 7 is a fragmentary sectional view showing the manner in which the longitudinal rods are held with the reduced portions radially outward and how the helically wound wire comes to said rods. Fig. 8 is a detail sectional view showing the manner in which the rods and wire are sunk together predetermined distances at their crossing points in the welding operation. Fig. 9 is a wiring diagram showing the manner of main current supply. Fig. 10 is a side view of a cylindrical screen made under the principles of my process. Fig. 11 is a part sectional elevation view showing the make-and-break and cut-out switch mechanism. Fig. 12 is a wiring diagram for said switch mechanism. Fig. 13 is an end view of a completed cylindrical screen. Fig. 14 is a similar view of half of such screen divided on line 14—14 of Fig. 13. Fig. 15 is a view of mechanism for forming a flat screen from the cylindrical or semi-cylindrical screen of Figs. 13 and 14. Fig. 16 is a plan view taken on the inside of a finished flat screen made up from the cylindrical screens of Figs. 13 and 14. Fig. 17 is a side elevation of the fitting used to finish the ends of the flat screen shown in Fig. 16. Fig. 18 is a plan view with some parts in section showing the manner in which the wire is fed in angular relation to the guide wall of the rolling electrode. Fig. 19 is a view of the cylindrical screen made by my process with the fittings secured thereon. Fig. 20 is a part sectional view on line 20—20 of Fig. 19 showing the manner in which the fittings are secured on the ends of rods extended beyond the ends of the screen. Fig. 21 illustrates the manner of applying the fittings. Fig. 22 is a view of the cylindrical plug used in welding on the fittings. Fig. 23 is an enlarged comparative cross-sectional view of wire and rods.

Means for supporting the instrumentalities for carrying out the various steps of the above-defined process comprise columns 3, 4 and 5 shown in Figs. 1 and 2 composed of concrete steel or any suitable material. Upon these supports are two longitudinal main beams 6 and 7 in Fig. 3, which are held in fixed parallel and spaced relation by head stock frame members 8 (which may be casting) and by tail stock frame casting 9 and further by a bottom tie plate 9a, as best shown in Fig. 5. This supporting bed will be of a length such as to permit the manufacture of the longest well screens. To that end the head stock and tail stock are separated a distance somewhat greater than the maximum length of well screen which it is desirable to make.

Referring to Fig. 1, a cylindrical hollow spindle 10 is provided with a conical forward extension 11 through which a group of rods 12 are guided as, in the operation of fabricating a screen, they are fed forward along the machine. The spindle 10 is provided with a cylindrical extension 13 which has bolted thereto a ring 14 formed with a horizontally annular flange 15 which will constitute the welding anvil, as clearly shown in Fig. 3. This ring 14 is removably secured to an annular flange 16 on cylindrical extension 13 by means of bolts 17, and is readily removable. For smaller sizes of screens the ring 14 may be bolted directly to the rear end of spindle 10, and the extension 13 be eliminated.

The ring 14 constitutes a guide head for the rods 12 and is provided with a circumferentially disposed set of apertures 18 as shown in Fig. 4 and Fig. 7. These apertures pass through an annular flange 19 formed on the guide head 14. The wires have the cross-sectional shape clearly shown at 20 in Fig. 7, roughly pear-shaped, with a body semicircular in cross-section at one side, and the sides converge from the semi-circular portion to a sharply acute angle at the apex. The apertures 18, also clearly shown in Fig. 7, have the same cross-sectional shape as the longitudinal wires or rods 12. These apertures are alined with semi-circular grooves 21 in the face of the annular flange portion 15, which in this way provides an anvil for holding the rods with their acute-angled edges extending radially outward with respect to the circle outlined by said edges in a vertical plane, which, as hereinafter described, constitutes the welding plane. The cylindrical extension 13 is secured to the spindle 10 through a ring member 22 by means of bolts 23 and 24, as clearly shown in Fig. 3, and this ring member is also provided with sets of apertures 25 of larger cross-sectional area than the rods 12 to guide said rods to the apertures 20 in the flange 19. The above construction makes practicable removal and change of both the cylindrical extension 13 and the anvil-carrying ring 14 to adapt the apparatus for fabricating cylindrical screen of desired differing sizes.

The wires 12, as clearly shown in Figs. 2 and 3, after passing through the welding plane in the grooves on the outer surface of anvil ring 15 extend through corresponding apertures 26 in a head plate 27 removably secured by means of bolts 28 to a head flange 29 fast on a hub casting 30 which is revolubly mounted on and secured at 31 to the front end 32 of a lead-screw 33 hereinafter described.

The spindle 10 is held to rotate on bearings formed upon and carried by the head-stock castings 8. A ring gear 34 fast on spindle 10 is driven by a spur gear 35 on a shaft 36 which is connected by a jaw coupling 37 with reduction gearing in box 38. The gearing in box 38 is driven by a pulley 39 through belt 40 from pulley 41 on shaft 42. This shaft is driven from an electric motor, shown at 40a, through intermediate change speed gearing of well-known construction, also not shown in detail, but being controlled by hand wheel 43. A hand lever 44 controls the clutch, of standard make not shown, for connecting the mechanism for operation and otherwise.

The head plate 27 on hub 30 is independent of and separable from the head ring 14 connected with spindle 10, and is driven to rotate in the same direction and at the same speed. This is accomplished by means of a spur gear 45 fast on the hub 30 adjacent a sleeve 46 which forms a bearing support for the hub 30 and its attached gear 45. The sleeve 46 is a part of a traveling support 47 which is held up by rollers 48 operating on ways 49 extending along the tops of frame pieces 6 and 7. The spur gear 45 is driven by a pinion 50 splined to slide along a shaft 51, as clearly shown in Fig. 2. The shaft 51 has thereon a pinion 52 which meshes with the ring gear 34 on spindle 10. The pinion 52 is of the same size as spur gear 35 which meshes with ring gear 34 and rotates spindle 10, consequently the head plates 14 and 27 are rotated at the same speed, carrying around the rods 12 extending between them in parallel relation and everywhere at the same speed.

The lead-screw 33 passes through a bracket support 53 upon which is journaled a spur gear 54. Gear 54 meshes with and is driven by a pinion 55 fast on a shaft 56 which extends along the frame from its rear at the bracket 53 to a point toward the front of the machine. Here, as best shown in Figs. 1 and 5, a nest of gears 57 fast on shaft 30 are adapted to cooperate with change-speed gearing 58 in a carrier 59 having splined connection with shaft 56 and being held in any selected position by means of control plunger 60 which cooperates with slots 62 in a keeper plate 61. By these means the pinion 55 and spur gear shaft 54 are driven at a desired selected speed. This advances the lead-screw 33 fast or slower as desired by means of the following construction.

Pivoted to rotate with spur gear 54 on arms 63 and 64 are halves of a split nut 65 with internal threads engageable with the threads on the lead-screw 33. This nut is locked in operative position by means of a knurled thimble 66 which is shown in Fig. 2 in its operative position. It may be withdrawn to rest upon stand 67 when it is desired to leave the lead-screw free from the driving means of spur gear 54. It will be apparent that as spur gear 54 is driven fast or slower the lead-screw 33 and the attached head 27 will be advanced at correspondingly differing rates in relation to the rate of rotation of heads 27 and 14 carrying the parallel rods 12. This will result in laying the coils of helically-wound wires, as now will be described, so their adjacent edges are spaced nearer or farther apart to make the drainage slots narrower or wider as may be desired.

The wire 70 which is helically wound upon the cylinder of rods has a cross-section such as indicated at 71 in Figs. 8 and 23. This comprises a flat top and converging side walls ending in a curved inner portion or edge. This wire is held and guided by means of guide rollers 72 on a pivoted platform 73 carried by an adjustable vertical stand 74, Figs. 1 and 4. As so guided and held the flat-top surface of the wire 70 will be maintained at all times in planes parallel to the axis of rotation of the members 27 and 14 and the cylinder outlined by the edges of the rods 12 carried thereby, with the convexly curved edge of the wire falling directly in the welding plane which extends vertically across said wires. As shown in Fig. 4, and more in detail in Fig. 7, this wire will be guided and held so that it will contact not only the acute-angled edge of a rod 12 at the point of welding, but at all times will also contact one or more of said rods in advance of the one where welding is taking place. The wire is also held so an edge thereof will at all times engage a vertical annular surface 105 on the welding disc electrode 76, as shown in enlarged detail in Figs. 7 and 18.

This electrode comprises a disc 76 held on a cylindrical carrier 77 by means of a nut 78, Figs. 3 and 8. The carrier rotates on an internal bearing extending from the end portion 79 of an arm 80 which is mounted for oscillating movement on a long bearing 81 extending between the arms 82, 83 of a fork on a standard 84. This standard is held on the frame at 85 for vertical adjustments thereon. The carrier 77 is provided with a cylindrical surface 86, Fig. 8, forming a contact drum between flanges 87 and 88 on the carrier 77. This surface is turned perfectly smooth and is engaged by the split halves 89 and 90 of a cylindrical contact shoe or brush. The halves are held in yielding engagement with the drum surface 86 by means of adjusting screw 91 engaging flange ears 92 at one side, and a second adjusting screw 93 engaging similar flanged ears 94 at the other side, and holding the halves in yielding engagement with the drum by means of a spring 95 interposed between flange 94 and the screwhead 93. As shown in Figs. 3 and 4, the shoe members 89, 90 are held from turning by means of a horizontal bar member 96 which is bolted to an upward projection 97 of shoe member 89. This bar 96 in turn is bolted at 98 to an assemblage of a multiplicity of metallic spring-leaf conductor members 99 which are positioned in the curved manner shown in Fig. 4 and have their other ends bolted at 100 to one of the terminals 101 of the core on the secondary side of transformer hereinafter to be described. As clearly shown in Figs. 4, 7 and 8 the rolling electrode 76 rests on the top surface of wire 70 in the welding plane vertical to the axis of rotation of the heads 14 and 27. Due to the weight of these parts the gravity pressure on the wire will be considerable. If it should be desirable to increase such pressure this may be effected by means of a suitable removable weight 102 hung on an arm 103.

Referring to Fig. 8 it will be noted that this rolling electrode 76 has a wire-engaging horizontal surface 104 and an annular vertical surface 105. Further, Figs. 7 and 18, that the wire 70 is so fed as to cause its advancing edge to firmly contact the vertical surface 105. This results in holding the wire, as successive coils are laid upon the cylindrical, longitudinally advancing cage of rods, so that the rear edge of said wire will always be uniformly spaced from the forward edge of the wire coil behind it to give a continuous slot of uniform width. Having reference to Figs. 8 and 9, it will be noted that the welding disc 76 is provided with a cylindrical surface 107 adjacent the annular vertical wall 105, which is of considerable width. Until the weld has taken place this wall will be spaced from the upturned edge of the rod as indicated at 108. The moment the metal softens, however, the surface 107 contacts the upper edge of wire 70, as shown in Fig. 9, with a highly important result hereinafter described.

The vertically movable disc electrode 76 is completely insulated from the frame as indicated at 109, 110, 111. The second electrode is of course the circumferential welding anvil 15, the drum 13 to which it is connected and the parts connected through drum 13 with the spindle 10. These comprise an annular contact ring 112 provided with an annular groove 113 in which is seated semi-circular tongues 114 on contact shoes 115, 116. These shoes, as shown in Fig. 4, rest upon the rotating contact surface of drum member 112 and are connected together by a group of leaf copper conductors 117 bolted to the respective members. These shoes are restrained from turning with the drum portion 112 by link 118, which is shown bolted at 119 to the connecting conductor members 117 and secured to the frame at 120, see Fig. 1. The contact shoes 115, 116, are in turn connected at 121 to a strip conductor member 122 which is bolted at 123 to the other terminal 124 of the core 125 of the transformer.

The source of control of electric current to the above-named welding instrumentalities is shown in Figs. 2, 4 and 6 and in the wiring diagram illustrated in Fig. 9. Current is supplied, either directly or through the make-and-break throwout system hereinafter described, through multiple switch indicated at 126 to the transformer 127, and which switch is controlled by the handle 128 making contacts with the taps 129 as shown in Fig. 4 and indicated by the pointer 130. The electric current is thereby passed through differing members of turns or coils of wire in the primary circuit of the transformer for suitable reduction of voltage and corresponding increase of amperage. Further control of line voltage supplied to the transformer is effected by a choke 143. Like current to the choke goes through multiple switch 131 and is controlled by the handle 132, making contacts with the desired one of taps 133, as indicated by pointer 134.

Following the wiring diagram of Fig. 9, line current is shown as being supplied by conductors 135, 136. The motor circuit is indicated at 137 controlled by the manually-operable switch 138. The welding circuit, in the form of Fig. 9, is opened and closed by manually-operable switch 139. This welding circuit includes the transformer windings 140 and 141, and these are selectively regulated by multiple switch member 142 adapted to engage any selected one of taps 129. In the primary circuit diagram is shown the choke 143 controlled by multiple switch 131, and switcharm 242 adapted to contact taps 133. By these means the line pressure of 240 volts is controlled and the primary turns adjusted to give the desired welding voltage of between 2 and 2½ volts in the secondary circuit and correspondingly increased amperage.

The secondary current of the transformer will of course flow to the vertically movable welding electrode 76 and thence through whatever contact is made in the welding operation to the vertically-stationary electrode forming the secondary circuit of the transformer as indicated in the wiring diagram of Fig. 9 at 144 and 145. Referring to Fig. 7, it will be obvious that the current may flow through the wire 70 contacted by the electrode 76 backward through rods already welded to the wire and ahead to and through all rods making contact with the wire. As always there is one or more of such rods being contacted in advance of the welding plane, it follows that these rods will be preliminarily heated by this flow of current. The shortest path for flow of current will ordinarily be through the wire in the vertical welding plane, as indicated at 146 in Fig. 7, and here there will be momentarily the greatest flow of current and heating effect sufficient to melt the contacting edges of the rods 12 and wire 70. As this takes place almost instantaneously, weight of the electrode and its carrier (and other weights if that be desirable) causes the fused rod and wire to merge together and permits the cylindrical surface 107, Fig. 8 to drop into contact with the upper edge of rod 12. Such contact not only limits physically the amount of sinking together of wire and rod, but at the same time distributes the current along that particular rod away from the welding point to check further fusion and permit rapid cooling thereof.

This cooling is very materially aided and the welding heat carried off by means of a constant current of water from pipes 147, Fig. 8. The pipe 148 discharges water into the interior of the carrier for electrode 76, whence it flows out at a point indicated at 149, flowing over the edge of the electrode and into the welding plane. Pipe 147 delivers the water upon the lower portion of welding ring 76 in a direction to cause it to flow continually over the welding point so that welding always takes place in flowing water. This water gravitates to a collecting pan 150 shown in Fig. 5 and gravitates to a sump indicated at 151 in Fig. 1, whence it is conveyed by a pump 152 and pipe 153 to a tank, not shown, from which water flows by gravity through a conveying pipe, not shown, to pipes 147, 148.

As heretofore pointed out, the high speed of rotation of the head plates 27 and 14 and the screen being fabricated, which is carried around thereby, cannot be instantly attained, nor can it be instantly stopped. And when the speed of such rotation is less than or diminishes below a certain point continued applying of the welding current would result in burning up or melting the wire between welds and destruction of that part of the screen. For this reason my invention includes the switch apparatus shown in Fig. 11, and the wiring diagram of Fig. 12 illustrates how this apparatus operates. As in the diagram of Fig. 9, line current is furnished by wires 135, 136, the motor current being controlled by switch 138 and the welding current by switch 139. The circuit A shown at the right of the diagram of Fig. 12 is the same as that of Fig. 9 and does not need to be separately described. The circuit B at the left of Fig. 12 is the one which controls the throw-in and throw-out of the make-and-break device.

This construction, as shown in Fig. 11, comprises a standard 154 mounted on the main frame on which is bolted at 155 a frame 156, comprising two vertical upright members formed of a suitable insulating or non-conducting material. The standard 154 also carries a shaft 157 which extends across the parallel insulating members of frame 156, and which has on its rear end a pinion 158 meshing with an idler 159. This idler meshes with a pinion 160 on a short shaft having thereon a second pinion 161 which meshes with the ring gear 34 on the spindle 10. By these means the shaft 157 is rotated at a desired speed. Mounted upon the shaft 157 to rotate with it is an insulating arm 162. This arm 162 carries a conducting contact piece 163 which is caused to move between contact sectors 164, 165 carried by stems 166, 167 extending through the non-conducting walls of frame 156. These sectors are normally held in separated relations so as not to be engaged by contact piece 163 by means of compression springs 168, 169 surrounding said stems and engaging between ends thereon and the outsides of non-conducting walls 156 as shown in Fig. 11. The stems 166 and 167 through wires 170, 171, or if desired the sectors 164, 165 directly, are connected with the line circuit wire 135 and wire 136 through the transformer and choke heretofore described. Upon arms 172 and 173 carried by the insulating walls of frame 156 are pivotally mounted levers 174, 175 which engage a grooved collar 176 pivotally connected with the armature of a solenoid 177. The outer ends of arms 174 and 175 are provided with depending spring fingers 178, 179 having in the facing sides of their outer ends insulating disks 174a and 175a. These disks engage the ends of the stems 166 and 167 respectively being normally held by springs 168, 169 in the position of Fig. 11. In this position the contact sectors 164, 165 are held so as not to be engaged or contacted by contact piece 163.

The solenoid 177 is adapted to be energized by current from the line current supplied by wires 180, 181, wire 180 being directly connected to the solenoid by means of a double switch 182.

Within the box 183 upon an extension of shaft 157 is mounted a governor switch of standard construction. The details of this governor switch are not shown, but it is indicated in the wiring diagram at 184, and when the rotation of shaft 157 reaches a certain predetermined speed it will operate to close the circuit at 184. When this happens current will pass through wires 185, 186, through relay 187, and cause the shifter lever 188 to rock, breaking the switch circuit at 182 and closing switch circuit at 189, whereupon the make-and-break of sectors 164, 165 and contact piece 163 will be thrown out and current will pass directly through wire 190 to the main welding current-control mechanism indicated in A of the wiring diagram, Fig. 12.

The operation of this part of the mechanism employed is as follows: When the switch 139 is closed current passes through solenoid 177, which being energized pulls its armature 27 to throw the contact sectors 164, 165 into position to be engaged by contact piece 163, and intermittent current thereby is caused to pass through wire 171 to the welding current control mechanism of A. The shaft 157 is timed in synchronism with the rate of rotation and spacing of rods carried by the rotating heads 14 and 27, so that the closing of the circuit occurs at the point of welding when the welding disk is above the rods and wires in the vertical welding plane and is broken between those points. This continues during acceleration of the heads and the rods carried thereby until the governor switch 184 is operated. At this moment the relay 187 is energized, resulting in moving the shifter lever 188 from position of Fig. 12 to that of Fig. 11, whereupon the solenoid 177 is de-energized, throwing out the make-and-break switch mechanism and throwing in direct continuous current to the welding-current control mechanism of A. When the machine is stopped the operation is in the reverse order. That is, when the speed of rotation diminishes to the point where the governor switch 184 shifts to break the circuit at that point relay 187 is de-energized, the solenoid 177 is energized and the make-and-break switch for current control is thrown in.

The construction produced by the practice of my process is well shown in Figs. 10 and 19. A cylindrical screen 191 is fabricated with the narrowed portions of the wire 70 and rods 12 sunk together and integrally united as indicated at 192 in Fig. 7, whereby there will be produced a succession of parallel helical coils of wire 193 secured upon the cylindrical cage of rods indicated generally at 294, and wherein the slots between the spaced wires whether they be regarded as a series of substantially circular slots or a single continuous helical slot, are, in fact, uniform in width and continuous in the sense that their full drainage area throughout their entire length is available for passing water or other fluid within, the very slight blocking effect of the supporting rods being fully offset by the outwardly converging walls of the several rods and the inwardly diverging walls of the slots at the points of union of rods and wire.

In the practice of fabricating a cylindrical screen employing my process, which may practically be made of diameters up to two feet or greater, and of lengths up to sixteen or eighteen feet, I leave extended from the beginning of the winding and securing of the wire a length of rods as indicated at 194. Likewise, at the other end of the screen I leave a similar body of rod ends as indicated at 195. Also, customarily in practice a band of a few coils of the wire are closely spaced together at the front and rear of the screen as indicated at 196, 197.

The fittings for the cylindrical screen as shown in Fig. 19, comprise a cylindrical member 198 embodying a male thread 199 applied at one end, and a cylindrical member 200 embodying a female thread 201 applied to the other end of the screen. The members 198 and 200 are each provided with longitudinal bores 202 corresponding in number and depth to the projecting ends 194 and 195 of the rods 12. Radial holes 203 extend through the body of members 198 and 200 into the aforesaid longitudinal bores 202. In integrating the fittings 198 and 200 with the ends 194, 195 of rods 12, I employ a cylindrical plug 204, Fig. 22, which is of a diameter such as to be admitted with the radial holes 203. This plug is subjected to pressure between welding electrodes 205, 206 without and within the fitting by which means the plug, the rod and the wall of the fitting are fused together and welded and the fitting is made integral with the ends of the rods and thus with the entire integral screen structure.

From the cylindrical structure illustrated in Fig. 10, a flat screen may be developed by the steps of my process indicated in Figs. 13 to 17 inclusive. In this practice the cylindrical screen will first be formed in the manner hereinbefore described of a diameter such that one half of the cylindrical screen when flattened will provide a flat screen of the desired width. Such a cylindrical screen as shown in Fig. 13 will be divided along the line indicated at 14—14, leaving a semi-cylinder 207 as shown in Fig. 14, in which the ends of the wire coils will be projected beyond the last rod on each side as indicated at 208 and 209. The semi-cylindrical screen member is then subjected to a bending action by the apparatus shown generally in Fig. 15. In this apparatus there will be two bottom or double rollers 210 and 211 each provided with longitudinal grooves 212 of a depth and so spaced as to receive the cylindrical portions of the rods welded in the screen. The rollers 210, 211 are driven in the same direction by a driving gear 213 which meshes with and between corresponding gears connected with rollers 210 and 211. A pressure roller 214 operates above roller 211. When, therefore, the same cylindrical screen 27 is put through this bending operation, it will come out flat, as indicated in Figs. 16 and 17.

In finishing this flat screen, bars 215 and 216 will be attached to the projected ends 194, 195 of the rods 12, these bars being of a thickness to bring their surfaces into a plane with the tops of the wires 70, and being welded to projecting ends 194 and 195. These bars will form the finished ends of the flat screen 217. At the sides of this screen there will be welded to the projecting ends 208, 209 of the wires 70 side bars 218 provided with flanges 219 which extend over the ends 208, 209 of the wires 70 and form sides of the screen. These fittings may also be provided with downward projections 220 and holes 221 which will form means of attaching the screen in any desired machine, as where it is used as a shaking screen for a mounting upon two pivot links.

The advantages of my aforesaid invention are reflected in features of superiority of the screen resulting from the practice of my process and in economy of operation in the production of the screen.

Of the features of superiority of the screen itself, there is first the fact that, whether in its cylindrical or flat form, there is in either case a multiplicity of crossing strands and wires, the latter uniformly spaced to provide continuous drainage slots of uniform width between adjacent pairs thereof, and the strands of wire and rods being metallically integrated at all crossing points so that the completed well screen comprises, in effect and in fact, a single and integrally-united piece of metal having a cellular structure, and consequently the highest degree of strength possible for the amount of metal employed.

As a well screen its capacity for water delivery on the basis of pumping power required is very greatly increased (in many sizes doubled) over water delivery capacities on the same ratings of well screens heretofore made. This is due to two factors in the fabrication of the screen: First, the continuous uniform drainage slot, or slots, if the slot between each pair of helical coils be regarded as a circumferential slot; and, second, the manner of welding the reduced portions of rods into reduced portions of wires whereby the drainage slot or slots is or are substantially uninterrupted by the supporting rods.

A third advantage of my screen, as a well screen or for any other uses, is found in its superior setting-in or development capacity. Development capacity consists in the adjustment of the immediately adjacent portions of the gravel beds surrounding the well screen in which lies the vein of water or other liquid to be pumped. This adjustment is effected by preliminary use of the well screen, in which a certain percentage of the finest sand or silt will pass through the slots and be discharged with the preliminary pumpings of water. This setting-in development or operation will continue until the grains of sand and gravel have arranged themselves about the well screen so that all of them are too large to pass through the drainage slots and no further grains will pass with the water. Under identical conditions of gravel-bed and diameter and width of drainage slots, the well screen of my process herein described will continue the setting-in operation over a much longer period permitting the development or rearrangement of the gravel and sand about the well screen to be carried back much farther into the strata, which is most desirable, for it adapts the screen when the setting-in operation is completed, to produce freer and fuller flow and a larger available supply of water or other liquid from a given vein.

A fourth advantage of the screen produced by my process is that, per unit of length for any diameter, particularly for the larger diameters, it employs much less material. It is lighter in weight for each unit of actual surface area, and enormously lighter in weight for each unit of capacity.

A fifth advantage of the screen produced by my process is that, per unit of weight, of length, of surface or of intake capacity it is stronger and better able to resist the stresses set up in installation and use. Deformation of the screen walls in connection with installation or use do not take place readily. More important still, if deformation does take place it does not result in destroying effective screen surface. The helical turns of wire are so completely fused into and integrated with the longitudinally supporting rods that deformation of any part of a wall of the screen will not result in separating the wire from the rods or opening the slots, but will maintain throughout the area of deformation substantially the same formation and relation.

A sixth advantage of my process, a contributing factor to produce the results in respect to deformation as above outlined, is that it enables use of materials of much greater tensile strength than have been employed heretofore in the manufacture of well screens. The process is adapted to the use of many different metals and alloys. In the practice of my process herein outlined, commercial screens are being manufactured: (1) from steels of varying carbon content; (2) from pure or substantially pure irons such as the brand of iron known as "Armco"; (3) from alloys of copper, silicon and manganese such as "Everdur" embodying 96% copper, 3% silicon and 1% manganese; (4) from copper-nickel-zinc, such as that known as "Ambrac," which contains 75% copper, 20% nickel and 5% zinc; (5) from copper-nickel alloys such as that known as "Monel metal," which contains 30% copper and 70% nickel; and (6) also from alloys from iron and chromium or iron, chromium and nickel known as "stainless steels." Broadly stated it is within the scope of my invention to employ the process upon any known metal or metallic alloy, or one which may be discovered, which is capable of electric welding. Many of these alloys not available in other screens, are resistant to the commercial strength acids used to break down and clean from the screen incrusting solids which accumulate in some conditions of use.

The above advantages in the screen apply to screens in the cylindrical form and specifically to well screens, and also in most particulars to screens made by the process in the flat form for any uses to which a flat screen may be adapted.

Under the second head of advantages of my process, to-wit, economy of production, it is possible, by using the steps of this process, and particularly the discovery that the intermittent welding of rods and wire at successive crossing points may be effected by continuous flow of welding current, to fabricate perfect cylindrical screens with extraordinary rapidity. Thus, a six inch screen with twenty supporting rods may, when the machine is operating at a rate to produce 1600 welds per minute be fabricated at a rate of four lineal feet for each five minutes of time. Or, what amounts to the same thing, such a screen sixteen feet long may be fabricated in twenty minutes. This does not include the time required for setting in the rods and starting operation of the machine, which ordinarily may require from five to ten minutes. Nor does it include the time required to put on the fittings. However, because of the step in my process of attaching said fittings directly to exposed ends of the rods front and rear, the attaching of fittings is itself a simple and speedy matter. It follows that the process enables the production of a better, more efficient, more durable screen at greatly reduced cost.

I claim:

1. The process of making screens which consists in holding a multiplicity of rods uniformly spaced predetermined distances and positioned to outline a circle with their outer portions in a transverse plane, securing a wire to a rod and feeding said wire across the rods in said plane, progressively and uniformly rotating said rods at a predetermined rapid rate in and advancing them longitudinally across said plane, supplying uninterrupted electrical welding current to said wire to flow from there to the rods as the wire is caused to be helically laid upon the rods by rotation and advancement thereof, the spacing of the rods and their rate of rotation being so related that the rods and wires are successively fused together and welded with great rapidity without softening or deforming intervening portions of the wire.

2. The process of making screens which consists in holding a multiplicity of rods uniformly spaced predetermined distances and positioned to outline a circle in a transverse plane with their outer portions, securing a wire to a rod and feeding said wire across the rods in said plane, progressively and uniformly rotating said rods at a predetermined rapid rate in and advancing them longitudinally across said plane, intermittently supplying electrical welding current for a limited time only to the wires and rods as the rate of rotation accelerates from zero to a predetermined rate and retards from said rate to zero, supplying uninterrupted electrical welding current to said wire when said rate of rotation is higher than said predetermined rate, the spacing of the rods and their rate of rotation being so related that the rods and wires are successively fused together and welded at their crossing points by the intermittent current supply when rotation is below the predetermined rate and are successively fused together and welded with great rapidity without softening or deforming intervening portions of the wire by uninterrupted electrical current when the rate of rotation is higher than the said predetermined rate.

3. The process of making well screens which consists in holding a multiplicity of rods spaced and positioned so their outer limits outline a circle in a single transverse plane, attaching a wire to a rod and feeding the wire across the rods in said plane, uniformly rotating said rods in and advancing them longitudinally across said plane continuously contacting said wires with an electrode supported thereby, and supplying welding current to the electrode in said plane at each successive crossing point of wire and rods to effect welding of the wire to each rod in said plane at each crossing point thereof.

4. The process of making screens which consists in holding a multiplicity of rods spaced and positioned so their outer limits outline a circle in a single transverse plane, attaching a wire to a rod and feeding the wire to move across the rods in said plane, uniformly rotating said rods in and advancing them longitudinally across said plane, continuously contacting said wire with an electrode supported thereby, passing electrical current from the electrode through the wire and each rod as the rod comes beneath the electrode, to cause the current to pass through the rod and wire and effect fusion thereof so that the weight of the electrode upon the wire will cause the rod and wire to sink together, and thereafter restraining movement of the electrode so that it can effect such sinking together to only a predetermined point.

5. The process of making screens which consists in winding a wire in a helix with closely and equally-spaced coils upon a group of longitudinally-extended rods positioned in one plane to outline a circle, continuously contacting said wire with an electrode supported thereby, intermittently supplying electrical welding current from the electrode to the wire for limited times while the electrode and wire are at crossing points of wire and rods as the rate of winding accelerates from zero to a predetermined rate and retards from said predetermined rate to zero, supplying uninterrupted electrical welding current to said wire when said rate of winding is higher than said predetermined rate, in either case causing current to pass through the rod and wire and effect fusion of contacting portions thereof, the weight of the electrode causing the fused portions of rod and wire to sink together, and thereafter restraining and holding the electrode so that it can effect such sinking together only to a predetermined amount.

6. In a process of making screens, to hold a group of rods so as to extend horizontally and with their outer limits to outline a circle in one vertical plane, to hold an electrode having a vertical wall in said plane, to hold and guide under tension an irregularly-shaped wire so that its top will be continuously engaged by said electrode and its side by said vertical wall and a selected part of the wire will be caused to contact with the horizontal rods in said plane, to simultaneously rotate in and advance longitudinally across said plane the group of rods, whereby the wire as so held will have the aforesaid selected portion caused to engage successively each rod to form a helix thereon with the coils of the helix closely and uniformly spaced apart, and to supply welding current from the electrode to the wire and rods at each crossing point thereof to metallically integrate the wire and rods by fusing the selected portion of the wire into and with the rods at each said crossing point.

7. In a process of making well screens, to hold a group of rods each formed with a reduced portion along its length coming to an acute-angled edge so the rods extend horizontally and the edges of the reduced portions radially to outline a circle in one vartical plane, to hold an electrode having a vertical wall in said plane, to hold and guide under tension a wire having a reduced portion and a widened portion engaged by said electrode and a continuous edge engaging said vertical wall so that the reduced portion of the wire will be positioned to contact the radially-disposed edges of the horizontal rods in said plane, to simultaneously rotate and advance longitudinally the group of rods whereby the wire as so held will have the aforesaid reduced portion thereof caused to engage successively the edges of the reduced portions of each rod to form a helix thereon with the coils of the helix closely and uniformly spaced apart, and to supply electrical welding current to the electrode to cause the reduced portions of the wire and rods to be fused and merged into one another and metallically integrated at all their crossing points.

8. In a process of making well screens, to hold a group of rods, each formed with a reduced portion along its length, coming to an acute-angled edge, so the rods extend horizontally and the edges of the reduced portions radially to outline a circle in one vertical plane, to hold an electrode in said plane, to hold and guide under tension a wire having a reduced portion so that the reduced portion of the wire will be positioned to contact the radially-disposed edges of the horizontal rods in said plane, to simultaneously rotate and advance longitudinally the group of rods whereby the wire as so held will have the aforesaid reduced portion thereof caused to engage successively the edges of the reduced portions of each rod to form a helix thereon with the coils of the helix closely and uniformly spaced apart, and to supply electrical welding current to the electrode to cause the reduced portions of the wire and rods to be fused and merged into one another and metallically integrated at all their crossing points.

9. A step in the process of making screens wherein a group of rods are held to outline a cylinder and are rotated and a wire is guided and laid thereon in a helix and an electrode continuously contacts said wire, which consists in supplying intermittent electrical welding current to the electrode while the rate of rotation of said rods and feed of the wire is accelerating from zero to a predetermined rate and retarding from the said predetermined rate to zero, and to supply continuous welding current to said electrode when the rate of rotation of the rods and feed of the wire is above said predetermined rate.

10. The process of making flat screens which consists in first forming a cylindrical screen by holding a group of rods to outline a circle, winding upon said circle of rods a wire to form a continuous helical slot of uniform width, welding the wire and rods together at each crossing thereof, cutting the cylinder so formed along an element thereof between a pair of rods, and rolling the resulting section of the cylinder to bring the outer limits of wires forming the coils on the cylinder into a plane surface.

11. The process of making flat screens which consists in first forming a cylindrical screen by holding a group of rods to outline a circle, winding upon said circle of rods a wire to form a continuous helical slot of uniform width, welding the wire and rods together at each crossing thereof, cutting the cylinder so formed along an element thereof between a pair of rods, and rolling the resulting section of the cylinder to bring the outer limits of wires forming the coils on the cylinder into a plane surface, and welding finished members and fittings to expose ends of wire and rods respectively.

12. The process of making flat screens which consists in first forming a cylindrical screen by holding a group of rods to outline a circle, winding upon said circle of rods a wire to form a continuous helical slot of uniform width, welding the wire and rods together at each crossing thereof, dividing the cylinder so formed along a diameter midway between opposite pairs of rods and rolling the resulting semi-cylindrical sections to bring the outer limits of the wires forming the coils on the cylinder into a plane surface.

13. The process of making flat screens which consists in first forming a cylindrical screen by holding a group of rods each having a reduced portion coming to an acute-angled edge so said edges outline and extend outwardly radially to a circle, winding upon said rod edges as so held a wire having a reduced portion caused to contact the edges of the rods to form with its adjacent coils a continuous helical slot of uniform width, welding the reduced portions of wire and rods together at each crossing point, cutting the cylinder so formed along one or more elements thereof between a pair or pairs of rods, and rolling the resulting section or sections of the cylinder to bring the outer limits of wires forming the coils of the cylinder into a plane surface.

14. The process of making screens which consists in holding a group of rods each having a reduced portion coming to an acute-angled edge so said edges outline and extend outwardly radially to a circle, winding upon said rod-edges as so held a wire having a reduced portion caused to contact the edges of the rods to form with its adjacent coils a continuous helical slot of uniform width, welding the reduced portions of wire and rods together at each crossing point, beginning and terminating the welding operation so as to leave a circle of rod ends at each end of the cylindrical screen so formed, and welding said rod ends to suitable fittings to make the bodies of said fittings integral with the rods.

15. The step in the process of making screens wherein a wire is caused to be helically wound on a body of rods held to outline a cylinder and an electrode is caused to continuously contact the wire, which consists in supplying electrical welding current to the electrode so as to pass the same successively through the wire only at crossing points of wire and rods until the contacting portions of metal and rods are softened, and then contacting the rod directly with the electrode to divert current from the point of welding.

16. The process of making screens which consists in winding helically a wire upon a multiplicity of longitudinal rods, holding said wire so that the edges thereof are uniformly spaced apart to form a continuous helical slot of uniform width, fusing adjacent portions of wire and rods at each crossing point as the wire is wound and causing the wire and rods to be sunk one within another while said portions are fused, terminating the sinking together at a predetermined point thereof so the adjacent portions of succeeding coils along any longitudinal element of the screen will fall in common planes, and continuously subjecting the points of fusion and the electrode to a stream of water to dissipate the heat.

17. A process of welding which consists in moving a multiplicity of spaced metallic elements transversely of said spacing at high speed, contacting said elements successively by a transverse metallic element, holding an electrode to continuously contact said transverse element and to move relatively to the spaced elements so as to be above said successive contacting points, supplying uninterrupted welding current to said electrode, and moving the spaced elements at such a high speed related to the distance of their spacing that the said uninterrupted welding current will pass successively through crossing points of said metallic elements to effect a suitable sinking together and welding at such crossing points only.

EDWARD E. JOHNSON.